United States Patent
Shih et al.

(10) Patent No.: US 9,257,896 B1
(45) Date of Patent: Feb. 9, 2016

(54) CONTROL CIRCUIT OF POWER CONVERTER AND METHOD FOR MAXIMUM POWER POINT TRACKING

(71) Applicant: Industrial Technology Research Institute, Hsinchu (TW)

(72) Inventors: Horng-Jzer Shih, Kaohsiung (TW); Tsan-Huang Chen, Hsinchu County (TW); Chien-Yu Chen, Taipei (TW); Bo-Ting Yeh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/594,164

(22) Filed: Jan. 11, 2015

(30) Foreign Application Priority Data

Nov. 28, 2014 (TW) .............................. 103141422 A

(51) Int. Cl.
*H02M 1/14* (2006.01)
*H02M 3/04* (2006.01)
*H02M 7/44* (2006.01)

(52) U.S. Cl.
CPC *H02M 1/14* (2013.01); *H02M 3/04* (2013.01); *H02M 7/44* (2013.01)

(58) Field of Classification Search
CPC ........... H02M 1/14; H02M 3/04; H02M 7/44; H02M 7/5387; H02M 1/42; Y02E 10/58; G05F 1/67
See application file for complete search history.

(56) References Cited

U.S. PATENT DOCUMENTS

| 3,489,915 A | * | 1/1970 | Englehardt | G05F 1/67 156/293 |
| 4,404,472 A | * | 9/1983 | Steigerwald | G05F 1/67 136/293 |
| 5,923,100 A | * | 7/1999 | Lukens | G05F 1/67 136/206 |

(Continued)

FOREIGN PATENT DOCUMENTS

| CN | 100508327 | 7/2009 |
| CN | 203261257 | 10/2013 |

(Continued)

OTHER PUBLICATIONS

Femia et al., "Optimization of Perturb and Observe Maximum Power Point Tracking Method," IEEE Transactions on Power Electronics, Jul. 2005, pp. 963-973.

(Continued)

*Primary Examiner* — Timothy J Dole
*Assistant Examiner* — Yusef Ahmed
(74) *Attorney, Agent, or Firm* — Jianq Chyun IP Office

(57) ABSTRACT

A control circuit of a power converter including a first and a second control modules is provided. The first control module sets sampling points for a ripple signal of an input voltage according to a reference signal. The first control module determines whether a power point is the maximum power point according to ripple voltages of the sampling points. The second control module controls the power converter to output a maximum power according to the maximum power point based on the determination result of the first control module and the reference signal. An embodiment of a method for tracking a maximum power point is provided. The input voltage of the power converter is measured. The sampling points are set for the ripple signal of the input voltage and phase information of the ripple signal is determined, such that the maximum power point is determined by using the ripple voltages.

22 Claims, 5 Drawing Sheets

(56) References Cited

U.S. PATENT DOCUMENTS

| | | | |
|---|---|---|---|
| 7,086,122 B2 | 8/2006 | Livingston | |
| 7,126,294 B2* | 10/2006 | Minami | G05F 1/67 318/139 |
| 7,994,768 B2 | 8/2011 | Park | |
| 8,072,187 B2 | 12/2011 | Wu et al. | |
| 8,279,644 B2 | 10/2012 | Zhang et al. | |
| 8,508,202 B2 | 8/2013 | Cho | |
| 8,514,599 B2 | 8/2013 | Lee et al. | |
| 8,754,627 B1 | 6/2014 | Le | |
| 2004/0021445 A1* | 2/2004 | Harris | G05F 1/67 320/136 |
| 2006/0290317 A1* | 12/2006 | McNulty | H02J 7/35 318/801 |
| 2009/0115393 A1* | 5/2009 | Yoshida | G05F 1/67 323/300 |
| 2009/0179500 A1* | 7/2009 | Ragonese | H02J 1/10 307/82 |
| 2010/0219690 A1* | 9/2010 | Femia | G05F 1/67 307/77 |
| 2010/0236612 A1* | 9/2010 | Khajehoddin | G05F 1/67 136/252 |
| 2010/0265747 A1* | 10/2010 | Egiziano | G05F 1/67 363/132 |
| 2011/0221418 A1* | 9/2011 | Chen | G05F 1/67 323/299 |
| 2011/0261593 A1* | 10/2011 | Pan | H02M 3/337 363/21.02 |
| 2011/0264288 A1* | 10/2011 | Khajehoddin | G05F 1/67 700/287 |
| 2012/0013312 A1* | 1/2012 | Hsieh | G05F 1/67 323/234 |
| 2012/0069602 A1* | 3/2012 | Escobar | G05F 1/67 363/13 |
| 2012/0087158 A1* | 4/2012 | Chapman | H02M 7/537 363/37 |
| 2012/0098510 A1* | 4/2012 | Galtie | H02M 3/156 323/282 |
| 2012/0126624 A1 | 5/2012 | Hester et al. | |
| 2012/0155126 A1* | 6/2012 | Yoneda | H02J 3/383 363/40 |
| 2012/0187768 A1* | 7/2012 | Goder | H02J 1/10 307/82 |
| 2013/0016536 A1* | 1/2013 | Ehlmann | H02J 3/385 363/34 |
| 2013/0051106 A1* | 2/2013 | Kuo | H02M 7/5387 363/132 |
| 2013/0141067 A1* | 6/2013 | Huang | G05F 1/67 323/282 |
| 2013/0162335 A1 | 6/2013 | Kim et al. | |
| 2013/0290743 A1 | 10/2013 | Lee et al. | |
| 2013/0322122 A1* | 12/2013 | Sigamani | H02M 1/4225 363/13 |
| 2014/0077785 A1* | 3/2014 | Jiang | G05F 5/00 323/299 |
| 2014/0268924 A1* | 9/2014 | Tang | H02M 3/33507 363/21.17 |

FOREIGN PATENT DOCUMENTS

| | | |
|---|---|---|
| TW | 201315116 | 4/2013 |
| TW | 201418929 | 5/2014 |
| TW | I461882 | 11/2014 |
| WO | 2009035995 | 3/2009 |

OTHER PUBLICATIONS

Patel et al., "Maximum Power Point Tracking Scheme for PV Systems Operating Under Partially Shaded Conditions," IEEE Transactions on Industrial Electronics, Apr. 2008, pp. 1689-1698.

Nguyen et al., "A Global Maximum Power Point Tracking Scheme Employing DIRECT Search Algorithm for Photovoltaic Systems," IEEE Transactions on Industrial Electronics, Oct. 2010, pp. 3456-3467.

Sera et al., "Improved MPPT algorithms for rapidly changing environmental conditions," 2006. 12th International Power Electronics and Motion Control Conference, Aug. 30, 2006-Sep. 1, 2006, pp. 1614-1619.

Hossain et al., "Design and Implementation of MPPT Controlled Grid Connected Photovoltaic System," 2011 IEEE Symposium on Computers & Informatics (ISCI), Mar. 20-23, 2011, pp. 284-289.

Esram et al., "Comparison of Photovoltaic Array Maximum Power Point Tracking Techniques," IEEE Transactions on Energy Conversion, Jun. 2007, pp. 439-449.

Office Action of Taiwan Counterpart Application, issued on Dec. 4, 2015, p. 1-p. 4.

* cited by examiner

CONTROL CIRCUIT OF POWER CONVERTER AND METHOD FOR MAXIMUM POWER POINT TRACKING

CROSS-REFERENCE TO RELATED APPLICATION

This application claims the priority benefit of Taiwan application serial no. 103141422, filed on Nov. 28, 2014. The entirety of the above-mentioned patent application is hereby incorporated by reference herein and made a part of this specification.

TECHNICAL FIELD

The disclosure relates to a control circuit of a power converter and a tracking method.

BACKGROUND

Today's energy generating system, for example, a photovoltaic system, mainly includes a photovoltaic array, an electric power regulator, a distribution box, a storage battery, etc., in which the electric power regulator, for example, includes a grid-tied protection device, an inverter or a system controller. Divided according to the types of the system, the photovoltaic systems can be divided into a grid-tied type, an independent type, and a mixed type photovoltaic system. Generally, the photovoltaic array is a solar cell module array formed by connecting solar panels in series and parallel, which is used for converting the solar energy into electric energy. However, in case that the solar panels are in a sunshine-shielding state or output voltages and currents of the solar panels are not matched, an output power of the photovoltaic array is decreased. Therefore, a control circuit used for tracking a maximum power point (MPP) is generally added to the system to obtain a maximum power output by the photovoltaic array.

SUMMARY

The disclosure is directed to a method for tracking a maximum power point, which is adapted to track the maximum power point of an energy generating system.

The disclosure provides a control circuit of a power converter, which is adapted to control the power converter to generate a maximum power according to a maximum power point.

The disclosure provides a control circuit of a power converter, which includes a first control module and a second control module. The first control module sets a plurality of sampling points for a ripple signal of an input voltage of the power converter according to a reference signal, and determines phase information of the ripple signal. The first control module determines whether a power point of an energy generating system is a maximum power point according to a plurality of ripple voltages corresponding to the sampling points. The second control module is electrically connected to the first control module. The second control module controls the power converter to output a maximum power according to the maximum power point based on a determination result of the first control module and the reference signal.

The disclosure provides a method for tracking a maximum power point, which is adapted to track the maximum power point of an energy generating system. The method includes following steps. A ripple signal of an input voltage of a power converter is received, a plurality of sampling points are set for the ripple signal according to a reference signal, and phase information of the ripple signal is determined. It is determined whether a power point of the energy generating system is the maximum power point according to a plurality of ripple voltages corresponding to the sampling points.

According to the above descriptions, in the exemplary embodiments of the disclosure, the method for tracking the maximum power point sets a plurality of sampling points for the ripple signal of the power converter, so as to determine whether the power point of the energy generating system is the maximum power point according to the ripple voltages.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
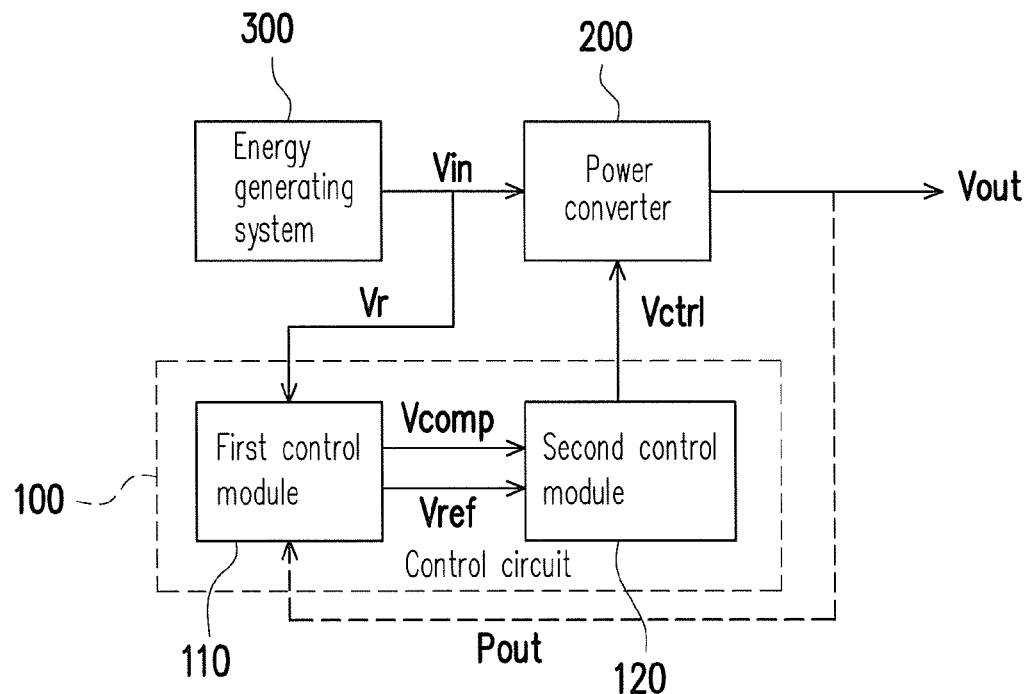
FIG. 1 is a schematic diagram of an energy generating system, a power converter and a control circuit thereof according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
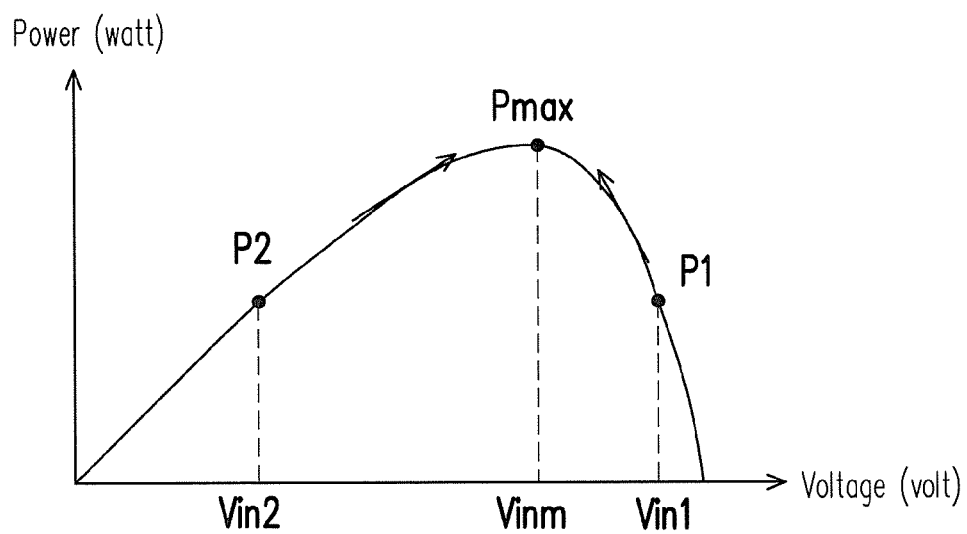
FIG. 2 is a diagram of a power and voltage characteristic curve of an energy generating system of FIG. 1.

FIG. 1 is a schematic diagram of an energy generating system, a power converter and a control circuit thereof according to an exemplary embodiment of the disclosure. FIG. 2 is a diagram of a power and voltage characteristic curve of the energy generating system of FIG. 1. Referring to FIG. 1 and FIG. 2, the energy generating system 300 of the present exemplary embodiment is adapted to generate an input voltage Vin, and output the input voltage Vin to a power converter 200. In the present exemplary embodiment, the input voltage Vin, for example, includes a direct current (DC) voltage serving as a signal main component, and carries a ripple signal Vr. The ripple signal Vr is generated due to an operation disturbance of the power converter 200, and the ripple signal Vr has a phase shift and a voltage slope change. The control circuit 100 is, for example, used for tracking a maximum power point Pmax of the energy generating system 300. When the maximum power point Pmax occurs, the energy generating system 300 outputs the maximum power, such that after the power converter 200 converts the input voltage Vin into an output voltage Vout, an output power Pout corresponding to the output voltage Vout is the maximum. Therefore, the maximum power point Pmax can be referred to as an optimal power point. In an exemplary embodiment that the energy generating system 300 is a photovoltaic system, the input voltage Vin is, for example, an output voltage generated by a photovoltaic array by converting the solar energy into electric energy.

In the present exemplary embodiment, the control circuit 100 includes a first control module 110 and a second control module 120. The first control module 110 sets a plurality of sampling points for the ripple signal Vr of the input voltage Vin according to a reference signal Vref, and determines phase information of the ripple signal Vr. In the present exemplary embodiment, the reference signal Vref is, for example, a synchronous signal related to timing information of an output power Pout of the power converter 200. Then, the first control module 110 determines whether a power point P1 or P2 of the energy generating system 300 is the maximum power point Pmax according to a plurality of ripple voltages corresponding to the sampling points. In the present exemplary embodiment, the power points P1 and P2 and the maximum power point Pmax respectively correspond to a first power voltage Vin1, a second power voltage Vin2 and a third power voltage Vinm. According to voltage magnitudes, a sequence of the power voltages from largest to smallest is the first power voltage Vin, the third power voltage Vinm and the second power voltage. The power voltages are, for example, signal main components included in the input voltage Vin at different power points. In an exemplary embodiment, during the operation that the first control module 110 tracks the maximum power point Pmax, the power point P1 is taken as an initial point to start tracking the maximum power point Pmax. In the exemplary embodiment that the energy generating system 300 is the photovoltaic system, in case that the power voltage of the power point p1 is the largest and a power value is zero, the corresponding input voltage Vin is an open-circuit voltage of a solar cell. In another exemplary embodiment, during the operation that the first control module 110 tracks the maximum power point Pmax, the power point P2 can be taken as the initial point to start tracking the maximum power point Pmax, which is not limited by the disclosure.

In the present exemplary embodiment, the second control module 120 is electrically connected to the first control module 110. The second control module 120 controls the power converter 200 to output a maximum power according to the maximum power point Pmax based on a determination result Vcomp of the first control module 110 and the reference signal Vref, and a control method thereof is, for example, to output a control signal Vctrl of a pulse-width modulation (PWM) type to control the operation of the power converter 200, though the disclosure is not limited thereto. Moreover, in the present exemplary embodiment, the determination result Vcomp output by the first control module 110 can be an analogy type or a digital type electric signal, which is not limited by the disclosure.

In the present exemplary embodiment, the input voltage Vin is, for example, a voltage generated by the energy generating system 300. The energy generating system 300 is, for example, a renewable energy generating system such as a photovoltaic system, a hydroelectric system, a tidal power generation system, an ocean current power generation systems, a wind power generation system, a thermal power generation system, a pressure power generation system or a vibration energy power generation system, etc. However, the disclosure is not limited thereto, and in other embodiments, the energy generating system 300 can also be a non-renewable energy generating system. Moreover, in the present exemplary embodiment, divided based on the type of the output voltage of the power converter 200, the power converter 200 is, for example, one of a DC-to-DC power converter and a DC-to-AC power converter. Divided based on an internal circuit structure of the power converter 200, the power converter 200 is, for example, one of a boost power converter, a buck power converter and a flyback power converter, or a combination of any two of the above power converters. Moreover, the power and voltage characteristic curve shown in FIG. 2 is only used as an example, and is not used for limiting the disclosure.

Figure 3:
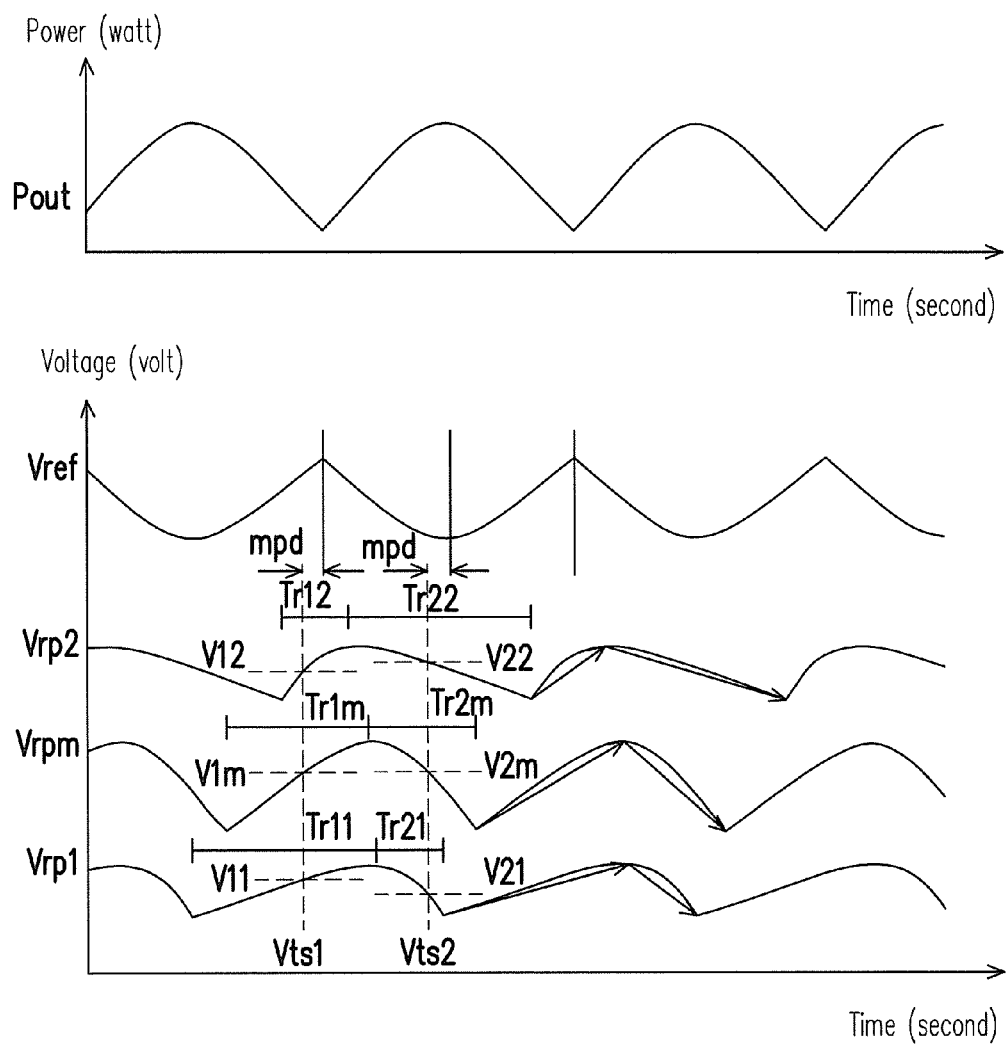
FIG. 3 is a waveform diagram of a ripple signal according to an exemplary embodiment of the disclosure.

FIG. 3 is a waveform diagram of the ripple signal according to an exemplary embodiment of the disclosure. Referring to FIG. 1 to FIG. 3, in the exemplary embodiment of FIG. 1, the first control module 110 sets a plurality of the sampling points for the ripple signal Vr of the input voltage Vin according to the reference signal Vref, for example, a first sampling point Vts1 and a second sampling point Vts2 shown in FIG. 3. Then, the first control module 110 determines whether the power point P1 or P2 of the energy generating system 300 is the maximum power point Pmax according to ripple voltages corresponding to the first sampling point Vts1 and the second sampling point Vts2.

To be specific, in the present exemplary embodiment, taking a ripple signal Vrp1 as an example, corresponding to the power point P1 shown in FIG. 2, the ripple signal Vrp1 is, for example, a ripple signal on the signal main component (for example, the first power voltage Vin1) of the input voltage Vin. In this example, the first sampling point Vts1 and the second sampling point Vts2 are respectively set at two different sides of a peak point of the ripple signal Vrp1, and respectively correspond to a first ripple voltage V11 and a second ripple voltage V21. In view of a phase, setting positions of the first sampling point Vts1 and the second sampling point Vts2 have a phase difference of 90 degrees or more than 90 degrees, though the disclosure is not limited thereto. In the present exemplary embodiment, the ripple signal Vrp1 includes a first waveform section Tr11 and a second waveform section Tr21. In the two waveform sections, voltage variations of the ripple signal Vrp1 along with time are respectively increase and decrease, as shown in FIG. 3. The first ripple voltage V11 is in the first waveform section Tr11, and the second ripple voltage V21 is in the second waveform section Tr21. In the waveform of the ripple signal Vrp1, in view of voltage variation, the voltage variation of the first waveform section Tr11 varied along with time (i.e. an absolute value of a voltage variation slope of the ripple signal Vrp1) is smaller than the voltage variation of the second waveform section Tr21 varied along with time. In the present exemplary embodiment, the voltage variation of the ripple signal Vrp1 varied along with time in different waveform sections is the absolute value of the voltage variation slope of the ripple signal Vrp1 on waveform. Moreover, in this example, the first ripple voltage V11 is greater than the second ripple voltage V21.

Then, taking a ripple signal Vrpm as an example, in the present exemplary embodiment, corresponding to the maximum power point Pmax of FIG. 2, the ripple signal Vrpm is, for example, a ripple signal on the signal main component (for example, the third power voltage Vinm) of the input voltage Vin. According to the setting method of the sampling points of the present exemplary embodiment, the first sampling point Vts1 and the second sampling point Vts2 are respectively set at two different sides of a peak point of the ripple signal Vrpm, and respectively correspond to a first ripple voltage Vim and a second ripple voltage V2m. In view of a phase, setting positions of the first sampling point Vts1 and the second sampling point Vts2 have a phase difference of 90 degrees or more than 90 degrees, though the disclosure is not limited thereto. In the present exemplary embodiment, the ripple signal Vrpm includes a first waveform section Tr1m and a second waveform section Tr2m. The first ripple voltage V1m is in the first waveform section Tr1m, and the second ripple voltage V2m is in the second waveform section Tr2m. In the waveform of the ripple signal Vrpm, the first ripple voltage V1m is equal to the second ripple voltage V2m.

Moreover, taking a ripple signal Vrp2 as an example, in the present exemplary embodiment, corresponding to the power point P2 of FIG. 2, the ripple signal Vrp2 is, for example, a ripple signal on the signal main component (for example, the second power voltage Vin2) of the input voltage Vin. According to the setting method of the sampling points of the present exemplary embodiment, the first sampling point Vts1 and the second sampling point Vts2 are respectively set at two different sides of a peak point of the ripple signal Vrp2, and respectively correspond to a first ripple voltage V12 and a second ripple voltage V22. In view of a phase, setting positions of the first sampling point Vts1 and the second sampling point Vts2 have a phase difference of 90 degrees or more than 90 degrees, though the disclosure is not limited thereto. In the present exemplary embodiment, the ripple signal Vrp2 includes a first waveform section Tr12 and a second waveform section Tr22. The first ripple voltage V12 is in the first waveform section Tr12, and the second ripple voltage V22 is in the second waveform section Tr22. In the waveform of the ripple signal Vrp2, in view of voltage variation, the voltage variation of the first waveform section Tr12 varied along with time is greater than the voltage variation of the second waveform section Tr22 varied along with time. Moreover, in the present example, the first ripple voltage V12 is smaller than the second ripple voltage V22.

In the present exemplary embodiment, the first control module 110, for example, takes the power point P1 as an initial point to start tracking the maximum power point Pmax of the energy generating system 300. During the tracking process, according to the setting method of the first sampling point Vts1 and the second sampling point Vts2, a magnitude relationship between the first ripple voltage and the second ripple voltage is changed from a situation that the first ripple voltage V11 is greater than the second ripple voltage V21 to a situation that the first ripple voltage V1m is equal to the second ripple voltage V2m, and is then changed from the situation that the first ripple voltage V1m is equal to the second ripple voltage V2m to a situation that the first ripple voltage V12 is smaller than the second ripple voltage V22. Namely, during the process that the first ripple voltage is changed from being greater than the second ripple voltage to a situation of being equal to the second ripple voltage and further to a situation of being smaller than the second ripple voltage, it represents that a comparison result of the first ripple voltage and the second ripple voltage is inversed. Therefore, when the first ripple voltage V1m is equal to the second ripple voltage V2m, the first control module 110 determines that the power point of the energy generating system 300 is the maximum power point Pmax.

In the present exemplary embodiment, the first sampling point Vts1 and the second sampling point Vts2 are respectively set at two different sides of the peak points of the ripple signals Vrp1, Vrp2 and Vrpm. In an exemplary embodiment, the first sampling point Vts1 and the second sampling point Vts2 can also be respectively set at two different sides of trough points of the ripple signals Vrp1, Vrp2 and Vrpm. In other words, in the disclosure, the ripple signals Vrp1, Vrp2 and Vrpm include waveform characteristic points, and the first sampling point Vts1 and the second sampling point Vts2 are set at two sides of the waveform characteristic points. The waveform characteristic points are, for example, the peak points or the trough points of the signal waveforms of the ripple signals Vrp1, Vrp2 and Vrpm.

On the other hand, in the present exemplary embodiment, the first control module 110, for example, tracks the maximum power points Pmax of the energy generating system 300 according to the reference signal Vref, and the second control module 120 also controls the power converter 200 to output the maximum power according to the reference signal Vref. In the present exemplary embodiment, the reference signal Vref is, for example, a synchronous signal, and is a basis of reference in operations of the electrical components in the control circuit 100, which is, for example, generated by the first control module 110 according to the output power Pout of the power converter 200, or generated in internal of the first control module, which is not limited by the disclosure. In an exemplary embodiment that the power converter 200 is a DC-to-AC power converter, the first control module 110 generates the reference signal Vref according to the output power Pout of the power converter 200. In an exemplary embodiment that the power converter 200 is a DC-to-DC power converter, the first control module 110 is, for example, configured with a sine wave generator to generate the reference signal Vref. The output power Pout, the reference signal Vref and the waveform of each of the ripple signals illustrated in FIG. 3 are only an example, and are not used for limiting the disclosure.

Moreover, in the present exemplary embodiment, the sampling point is, for example, set by taking a peak point or a trough point of the reference signal Vref as a reference point and delaying the reference point by a phase. For example, the first sampling point Vts1 is set by delaying a reference point by a phase mpd while taking the peak point of the reference signal Vref as the reference point. The second sampling point Vts2 is set by delaying a reference point by a same phase mpd while taking the trough point of the reference signal Vref as the reference point. In an exemplary embodiment, the sampling point can also be directly generated by taking the peak point or the trough point of the reference signal Vref as the reference point without any delay.

Figure 4:
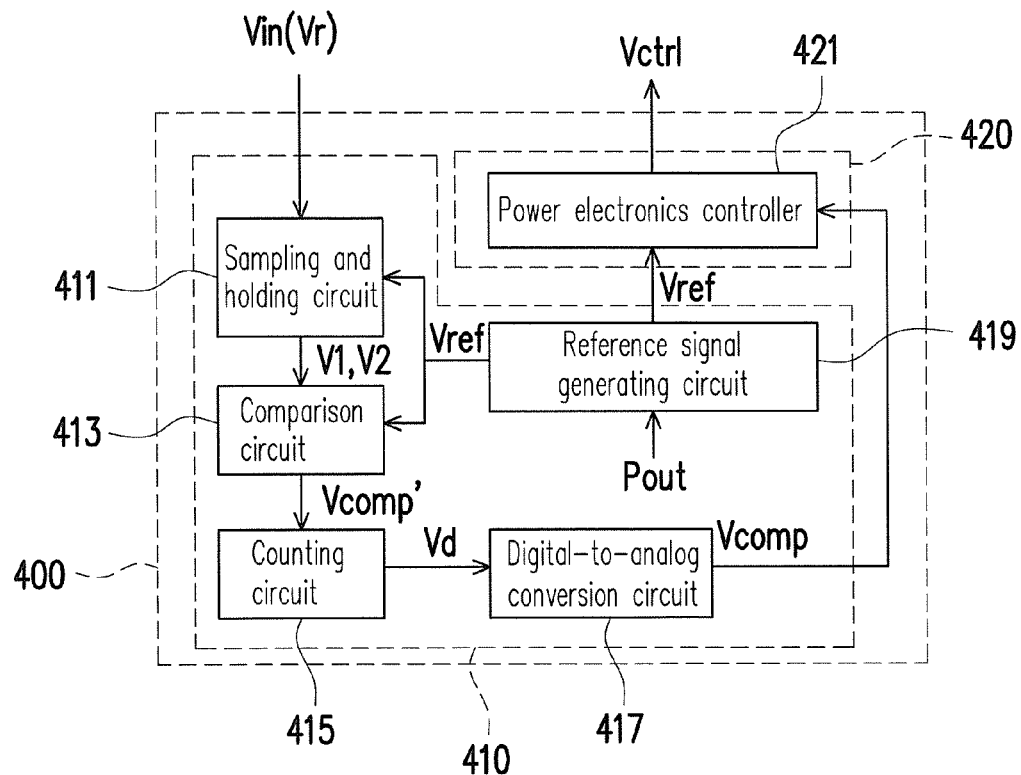
FIG. 4 is a schematic diagram of an internal circuit structure of a control circuit according to an exemplary embodiment of the disclosure.

FIG. 4 is a schematic diagram of an internal circuit structure of a control circuit according to an exemplary embodiment of the disclosure. Referring to FIG. 1 and FIG. 4, the control circuit 400 of the present exemplary embodiment includes a first control module 410 and a second control module 420. In the present exemplary embodiment, the first control module 410 includes a sampling and holding circuit 411, a comparison circuit 413, a counting circuit 415 and a digital-to-analog conversion circuit 417. The second control module 420 includes a power electronics controller 421.

To be specific, in the present exemplary embodiment, the sampling and holding circuit 411 is, for example, coupled to the power converter 200. The sampling and holding circuit 411 is used for receiving the ripple voltage Vr of the input voltage Vin, and performs a sampling and holding operation to the ripple signal Vr according to the first and the second sampling points Vts1 and Vts2 to obtain the first and the second ripple voltages V1 and V2. In the present exemplary embodiment, the first and the second sampling points Vts1 and Vts2, for example, respectively correspond to the first and the second ripple voltages V1 and V2. Based on different received ripple signal Vr (for example, the ripple signal Vrp1, Vrpm or Vrp2), the first ripple voltage V1 is probably one of the first ripple voltages V11, V1m and V12 shown in FIG. 3, and the second ripple voltage V2 is probably one of the second ripple voltages V21, V2m and V22 shown in FIG. 3.

Then, in the present exemplary embodiment, the comparison circuit 413 is coupled to the sampling and holding circuit 411. The comparison circuit 413 compares the first ripple voltage V1 and the second ripple voltage V2, and outputs a comparison result Vcomp' to the counting circuit 415. For example, when the first ripple voltage V1 is smaller than the second ripple voltage V2, shown as the ripple signal Vrp2 of FIG. 3, the comparison circuit 413 outputs the comparison result Vcomp' with a low level (for example, with a digital value of 0) to the counting circuit 415. When the first ripple voltage V1 is greater than the second ripple voltage V2, shown as the ripple signal Vrp1 of FIG. 3, the comparison circuit 413 outputs the comparison result Vcomp' with a high level (for example, with a digital value of 1) to the counting circuit 415. When the first ripple voltage V1 is equal to the second ripple voltage V2, shown as the ripple signal Vrpm of FIG. 3, the output of the comparison circuit 413 is maintained unchanged. Namely, if the comparison circuit 413 outputs the comparison result Vcomp' with the digital value of 1 to the counting circuit 415 at a previous timing, when the first ripple voltage V1 is equal to the second ripple voltage V2, the comparison circuit 413 still outputs the comparison result Vcomp' with the digital value of 1 to the counting circuit 415, and vice versa.

In the present exemplary embodiment, the counting circuit 415 is coupled to the comparison circuit 413. The counting circuit 415 is used for generating a counting signal Vd to the digital-to-analog conversion circuit 417 according to the comparison result Vcomp' during a time period. To be specific, the number of times that the counting circuit 415 reads the comparison result Vcomp' can be set, so as to generate the counting signal Vd during the time period. For example, it is assumed that during the time period, the counting circuit 415 reads the comparison result Vcomp' by 10 times, and the digital values thereof are all 1, it represents that during this time period, a ratio of the high level is 1, and now the counting value of the counting circuit 415 is added by N, where N is a positive integer greater than 1. It is assumed that during the time period, the counting circuit 415 reads the comparison result Vcomp' by 10 times, and the digital values thereof include 1 and 0, it represents that during this time period, the ratio of the high level is between 0 and 1, and now the counting value of the counting circuit 415 is added by 1. It is assumed that during the time period, the counting circuit 415 reads the comparison result Vcomp' by 10 times, and the digital values thereof are all 0, it represents that during this time period, the ratio of the high level is 0, and now the counting value of the counting circuit 415 is decreased by N. Therefore, in the present exemplary embodiment, the counting circuit 415 generates the counting signal Vd to the digital-to-analogy conversion circuit 417 according to the comparison result Vcomp' during the time period. In the present exemplary embodiment, the number of times that the counting circuit 415 reads the comparison result Vcomp' can be dynamically set, so as to adjust a length of the time period. The less the number of times that the counting circuit 415 reads the comparison result Vcomp' is, the shorter the length of the time period is. In an exemplary embodiment, the number of times that the counting circuit 415 reads the comparison result Vcomp' can be set to 1, so as to immediately obtain the tracking result of the maximum power point Pmax. Moreover, in the present exemplary embodiment, in case that the ratio of the high level is 1, the greater the counting value N added by the counting circuit 415 is, the faster the first control module 410 tracks the maximum power point Pmax.

Thereafter, the counting circuit 415 outputs the counting signal Vd to the digital-to-analog conversion circuit 417. In the present exemplary embodiment, the digital-to-analog conversion circuit 417 is coupled to the counting circuit 415. The digital-to-analog conversion circuit 417 is used for converting the counting signal Vd of the digital form into an analog signal to serve as a comparison result Vcomp, and outputs the comparison result Vcomp to the second control module 420.

On the other hand, in the present exemplary embodiment, the first control module 410 further includes a reference signal generating circuit 419. The reference signal generating circuit 419 is coupled to the power converter 200. The reference signal generating circuit 419 is used for generating the reference signal Vref according to the output power Pout of the power converter 200, as shown in FIG. 3. In an exemplary embodiment, the reference signal generating circuit 419 can also generate the reference signal Vref according to the output power Pout of the power converter 200, which is not limited by the disclosure. In the present exemplary embodiment, the control circuit 400 is, for example, used for controlling the DC-to-AC type power converter 200. The reference signal generating circuit 419 receives the output power Pout of the power converter 200, and generates the reference signal Vref according to timing information of the output power Pout. The reference signal generating circuit 419 at least outputs the reference signal Vref to the sampling and holding circuit 411, the comparison circuit 413 and the power electronics controller 421 to serve as a synchronous signal to synchronize circuit operation timings of the above three circuits.

On the other hand, in the present exemplary embodiment, the power electronics controller 421, for example, controls the power converter 200 to generate the maximum power according to the maximum power point Pmax based on the determination result Vcomp and the reference signal Vref, and the control method thereof is, for example, to output the control signal Vctrl of the PWM type to control the operation of the power converter 200, which is not limited by the disclosure.

Figure 5:
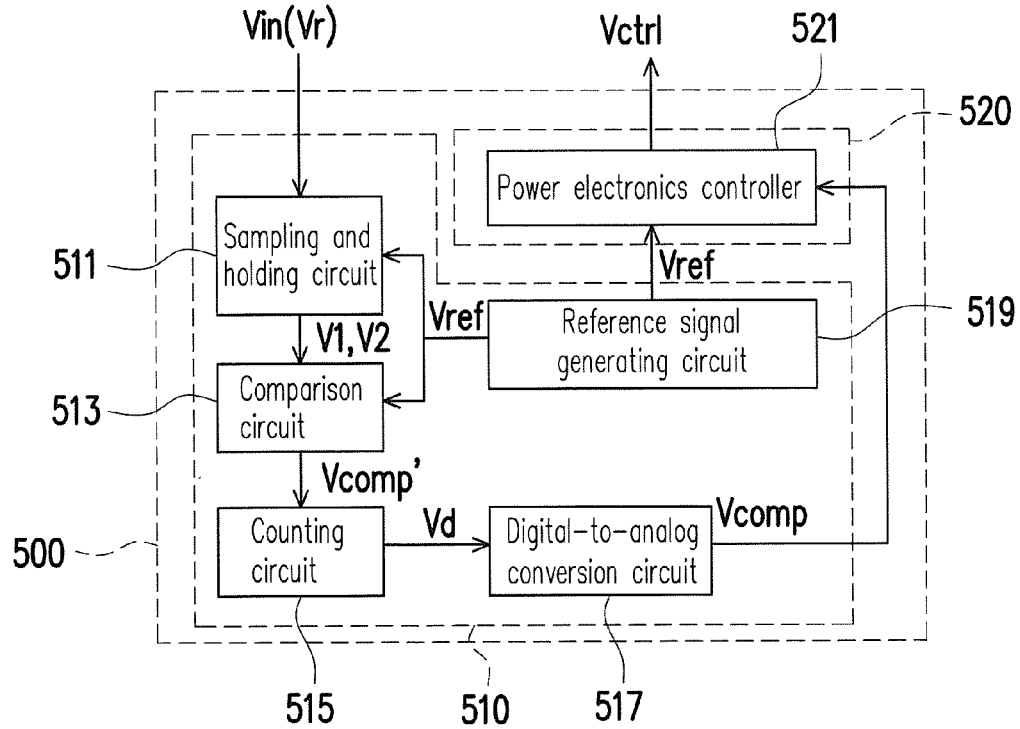
FIG. 5 is a schematic diagram of an internal circuit structure of a control circuit according to another exemplary embodiment of the disclosure.

FIG. 5 is a schematic diagram of an internal circuit structure of the control circuit according to another exemplary embodiment of the disclosure. The control circuit 500 of the present exemplary embodiment is similar to the control circuit 400 of FIG. 4, and a main difference there between is that the control circuit 500 is used for controlling the DC-to-DC type power converter 200. To be specific, in the present exemplary embodiment, the reference signal generating circuit 519 does not generate the reference signal Vref according to the output signal of the power converter 200. The reference signal generating circuit 519 of the present exemplary embodiment is, for example, sine wave generator, which can be used for generating the reference signal Vref of a sine-wave form to serve as the synchronous signal, so as to synchronize the circuit operation timings of the sampling and holding circuit 511, the comparison circuit 513 and the power electronics controller 521.

Moreover, since those skilled in the art can learn enough instructions and recommendations of the operations of the circuit blocks of the present exemplary embodiment from the descriptions of the embodiment of FIG. 4, detailed descriptions thereof are not repeated.

Figure 6:
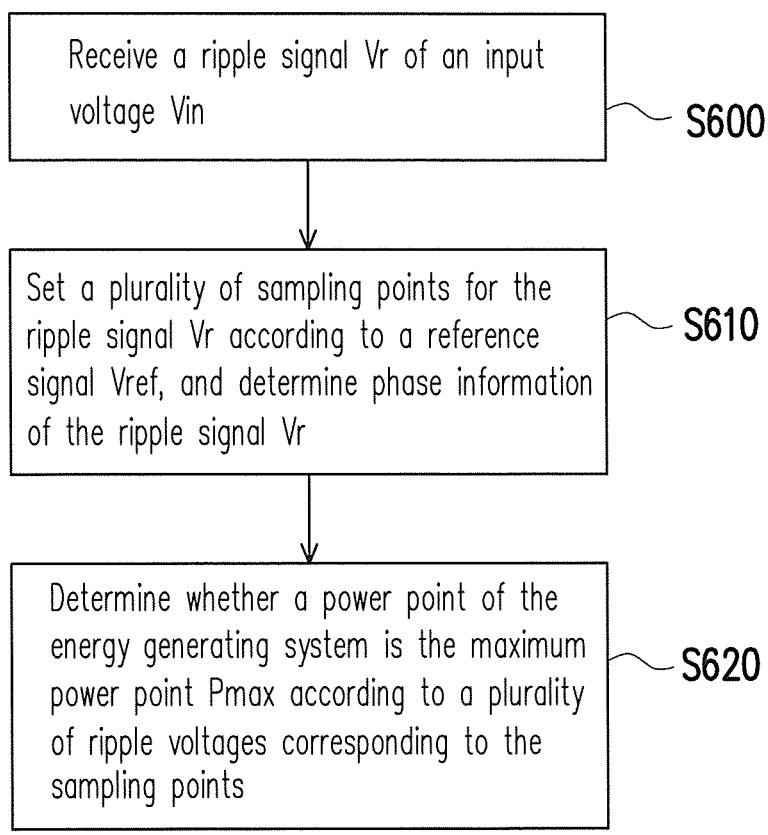
FIG. 6 is a flowchart illustrating a method for tracking a maximum power point according to an exemplary embodiment of the disclosure.

FIG. 6 is a flowchart illustrating a method for tracking a maximum power point according to an exemplary embodiment of the disclosure. Referring to FIG. 1 and FIG. 6, the method for tracking the maximum power point of the present exemplary embodiment is, for example, adapted to the energy generating signal 300, the power converter 200 and the control circuit 100 of FIG. 1. In the present exemplary embodiment, the method can be used for tracking the maximum power point Pmax of the energy generating system 300. The method includes following steps. In step S600, the first control module 110 is used to receive the ripple signal Vr of the input voltage Vin of the power converter 200. In step S610, the first control module 110 is used to set a plurality of sampling points for the ripple signal Vr according to the reference signal Vref, and determine phase information of the ripple signal Vr. For example, the first sampling point Vts1 and the second sampling point Vts2 of FIG. 3. In step S620, the first control module 110 is used to determine whether a power point of the energy generating system is the maximum power point Pmax according to a plurality of ripple voltages corresponding to the sampling points.

Therefore, in the present exemplary embodiment, the method for tracking the maximum power point is to directly measure a status of the input voltage input to the power converter other than indirectly estimating a system status by measuring the input voltage and input current input to the power converter or according to a working status of a power regulator as that does in the conventional technique. Namely, in the present exemplary embodiment, the method for tracking the maximum power point is implemented by measuring the input voltage Vin of the power converter 200 without considering an input current.

Moreover, since those skilled in the art can learn enough instructions and recommendations for the method for tracking the maximum power point of the present exemplary embodiment from the descriptions of the exemplary embodiments of FIG. 1 to FIG. 5, detailed description thereof is not repeated.

Figure 7:
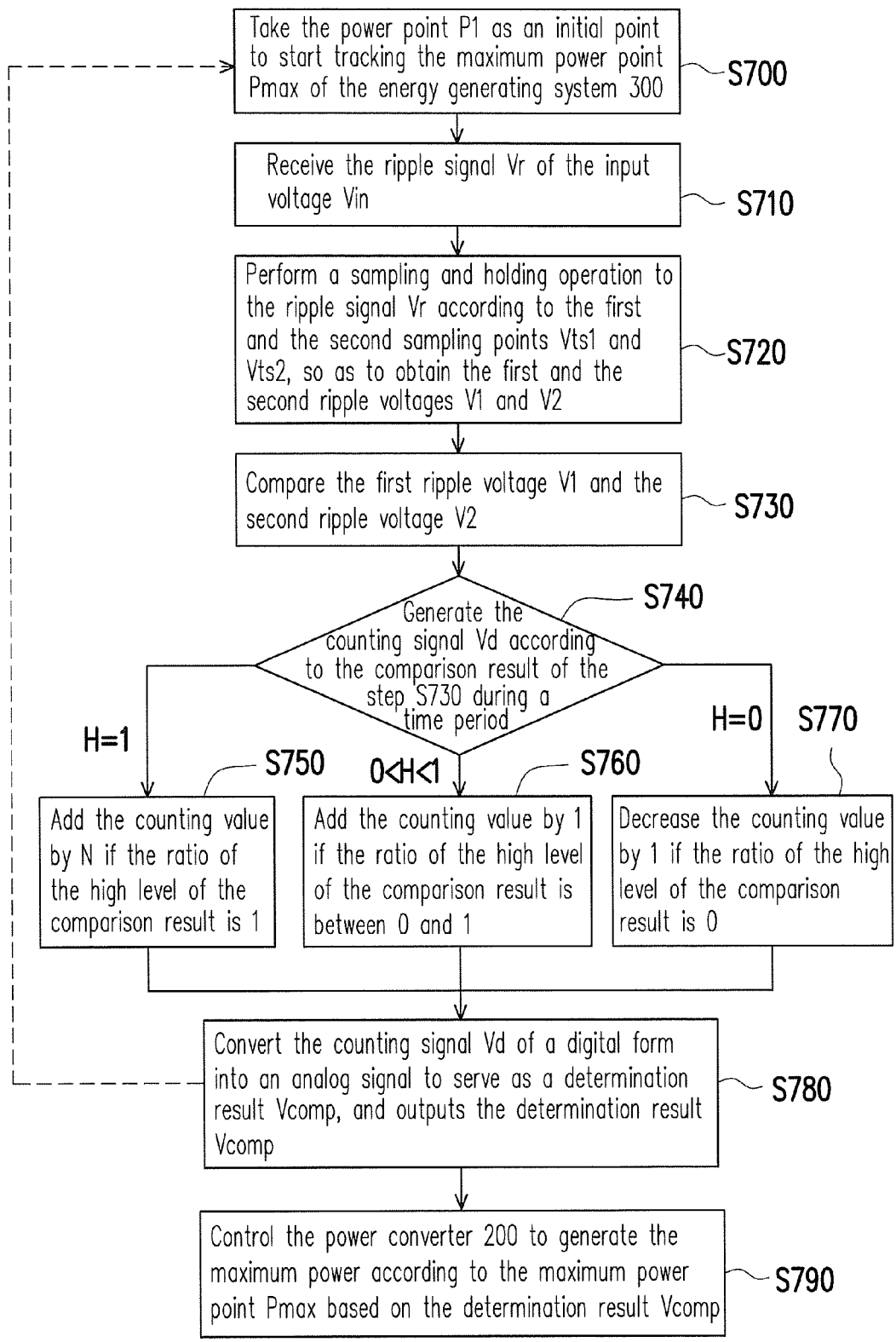
FIG. 7 is a flowchart illustrating a method for controlling a power converter according to an exemplary embodiment of the disclosure.

FIG. 7 is a flowchart illustrating a method for controlling a power converter according to an exemplary embodiment of the disclosure. Referring to FIG. 1 and FIG. 7, the method for controlling the power converter of the present exemplary embodiment is, for example, adapted to the energy generating system 300, the power converter 200 and the control circuit 100 of FIG. 1. The method for controlling the power converter includes following steps. In step S700, the first control module 110 is used to take the power point P1 as an initial point to start tacking the maximum power point Pmax of the energy generating system 300. In step S710, the first control module 110 is used to receive the ripple signal Vr of the input voltage Vin. In step S720, the first control module 110 is used to perform a sampling and holding operation to the ripple signal Vr according to the first and the second sampling points Vts1 and Vts2, so as to obtain the first and the second ripple voltages V1 and V2. In step S730, the first control module 110 is used to compare the first ripple voltage V1 and the second ripple voltage V2. in step S740, the counting signal Vd is generated according to the comparison result of the step S730 during a time period.

Then, in step S750, during the above time period, if the ratio of the high level of the comparison result is 1, the counting value of the counting circuit within the first control module 110 is added by N to generate the counting signal Vd. In step S760, during the time period, if the ratio of the high level of the comparison result is between 0 and 1, the counting value of the counting circuit within the first control module 110 is added by 1 to generate the counting signal Vd. In step S770, during the time period, if the ratio of the high level of the comparison result is 0, the counting value of the counting circuit within the first control module 110 is decreased by 1 to generate the counting signal Vd. Then, in step S780, the first control module 110 is used to convert the counting signal Vd of a digital form into an analog signal to serve as a determination result Vcomp, and outputs the determination result Vcomp to the second control module 120. Thereafter, in step S790, the second control module 120 controls the power converter 200 to generate the maximum power according to the maximum power point Pmax based on the determination result Vcomp. In an exemplary embodiment, the after the step S780 is completed, the method flow may return to the step S700 to again track the maximum power point.

Moreover, since those skilled in the art can learn enough instructions and recommendations of the method for controlling the power converter of the present exemplary embodiment from the descriptions of the embodiments of FIG. 1 to FIG. 6, detailed descriptions thereof are not repeated.

In summary, in the exemplary embodiments of the disclosure, the method for tracking the maximum power point is to set a plurality of sampling points at the first waveform section and the second waveform section on the waveform of the ripple signal of the power converter, and determine the phase information of the ripple signal, and compare the ripple voltages corresponding to the sampling points. Therefore, when the maximum power point occurs, the comparison result of the ripple voltages is inversed, and the power point corresponding to the inversion is determined to be the maximum power point.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A control circuit of a power converter, the control circuit comprising:
   a first control module, setting a plurality of sampling points for a ripple signal of an input voltage of the power converter according to a reference signal, determining phase information of the ripple signal, and determining whether a power point of an energy generating system is a maximum power point according to a plurality of ripple voltages corresponding to the sampling points; and
   a second control module, electrically connected to the first control module, and controlling the power converter to output a maximum power according to the maximum power point based on a determination result of the first control module and the reference signal, wherein the ripple voltages comprise a first ripple voltage and a second ripple voltage, and when the first ripple voltage is equal to the second ripple voltage, the first control module determines the power point of the energy generating system to be the maximum power point.

2. The control circuit as claimed in claim 1, wherein the ripple signal comprises a first waveform section and a second waveform section, the first ripple voltage exists in the first waveform section, and the second ripple voltage exists in the second waveform section, and when a voltage variation of the first waveform section varied along with time is greater than a voltage variation of the second waveform section varied along with time, the first ripple voltage is smaller than the second ripple voltage, wherein the voltage variations are varied with time.

3. The control circuit as claimed in claim 2, wherein when the voltage variation of the first waveform section varied along with time is smaller than the voltage variation of the second waveform section varied along with time, the first ripple voltage is greater than the second ripple voltage.

4. The control circuit as claimed in claim 1, wherein the sampling points are set by delaying a phase of a reference point while taking a peak point or a trough point of the reference signal as the reference point.

5. The control circuit as claimed in claim 1, wherein the sampling points comprise a first sampling point and a second sampling point, and the ripple signal comprises a waveform characteristic point, and the first sampling point and the second sampling point are set at two sides of the waveform characteristic point.

6. The control circuit as claimed in claim 5, wherein the waveform characteristic point is a peak point or a trough point of a signal waveform of the ripple signal.

7. The control circuit as claimed in claim 1, wherein the power point of the energy generating system corresponds to a first power voltage, the maximum power point of the energy generating system corresponds to a second power voltage, and the first control module takes the power point as an initial point to track the maximum power point of the energy generating system, wherein the first power voltage is greater than the second power voltage.

8. The control circuit as claimed in claim 1, wherein the first control module comprises:
 a sampling and holding circuit, coupled to the power converter, configured to receive the ripple signal of the input voltage, and performing a sampling and holding operation to the ripple signal according to the sampling points, so as to obtain the ripple voltages;
 a comparison circuit, coupled to the sampling and holding circuit, configured to compare the ripple voltages, and outputting a comparison result;
 a counting circuit, coupled to the comparison circuit, and configured to generate a counting signal within a time period according to the comparison result; and
 a digital-to-analog conversion circuit, coupled to the counting circuit, and configured to convert the counting signal into an analog signal to serve as the determination result, and outputting the determination result to the second control module.

9. The control circuit as claimed in claim 8, wherein the first control module further comprises:
 a reference signal generating circuit, coupled to the power converter, and configured to generate the reference signal according to an output signal of the power converter.

10. The control circuit as claimed in claim 1, wherein the power converter is one of a boost power converter, a buck power converter and a flyback power converter or a combination of any two of the above power converters.

11. The control circuit as claimed in claim 1, wherein the input voltage of the power converter is generated by the energy generating system, and the energy generating system is one of a photovoltaic system, a hydroelectric system, a tidal power generation system, an ocean current power generation systems, a wind power generation system, a thermal power generation system, a pressure power generation system and a vibration energy power generation system.

12. The control circuit as claimed in claim 1, wherein the power converter is one of a DC-to-DC power converter and a DC-to-AC power converter.

13. A method for tracking a maximum power point, adapted to track the maximum power point of an energy generating system, the method for tracking the maximum power point comprising:
 receiving a ripple signal of an input voltage of a power converter;
 setting a plurality of sampling points for the ripple signal according to a reference signal, and determining phase information of the ripple signal; and
 determining whether a power point of the energy generating system is the maximum power point according to a plurality of ripple voltages corresponding to the sampling points, wherein the ripple voltages comprise a first ripple voltage and a second ripple voltage, and the step of determining whether the power point of the energy generating system is the maximum power point comprises determining the power point of the energy generating system to be the maximum power point when the first ripple voltage is equal to the second ripple voltage.

14. The method for tracking the maximum power point as claimed in claim 13, further comprising:
 taking a peak point or a trough point of the reference signal as a reference point and setting the sampling points by delaying the reference point by a phase.

15. The method for tracking the maximum power point as claimed in claim 13, wherein the power point of the energy generating system corresponds to a first power voltage, the maximum power point of the energy generating system corresponds to a second power voltage, and the method for tracking the maximum power point further comprises:
 taking the power point as an initial point to track the maximum power point of the energy generating system, wherein the first power voltage is greater than the second power voltage.

16. The method for tracking the maximum power point as claimed in claim 13, wherein the sampling points comprise a first sampling point and a second sampling point, and the ripple signal comprises a waveform characteristic point, and the first sampling point and the second sampling point are set at two sides of the waveform characteristic point.

17. The method for tracking the maximum power point as claimed in claim 16, wherein the waveform characteristic point is a peak point or a trough point of a signal waveform of the ripple signal.

18. The method for tracking the maximum power point as claimed in claim 13, wherein the step of determining whether the power point of the energy generating system is the maximum power point comprises:
 performing a sampling and holding operation to the ripple signal according to the sampling points, so as to obtain the ripple voltages;
 comparing the ripple voltages, and outputting a comparison result;
 generating a counting signal within a time period according to the comparison result; and
 converting the counting signal into an analog signal to serve as the determination result.

19. The method for tracking the maximum power point as claimed in claim 13, further comprising:
 generating the reference signal according to an output signal of the power converter.

20. The method for tracking the maximum power point as claimed in claim 13, wherein the power converter is one of a boost power converter, a buck power converter and a flyback power converter or a combination of any two of the above power converters.

21. The method for tracking the maximum power point as claimed in claim 13, wherein the input voltage of the power converter is generated by the energy generating system, and the energy generating system is one of a photovoltaic system, a hydroelectric system, a tidal power generation system, an ocean current power generation systems, a wind power generation system, a thermal power generation system, a pressure power generation system and a vibration energy power generation system.

22. The method for tracking the maximum power point as claimed in claim 13, wherein the power converter is one of a DC-to-DC power converter and a DC-to-AC power converter.

* * * * *